Figure 1:
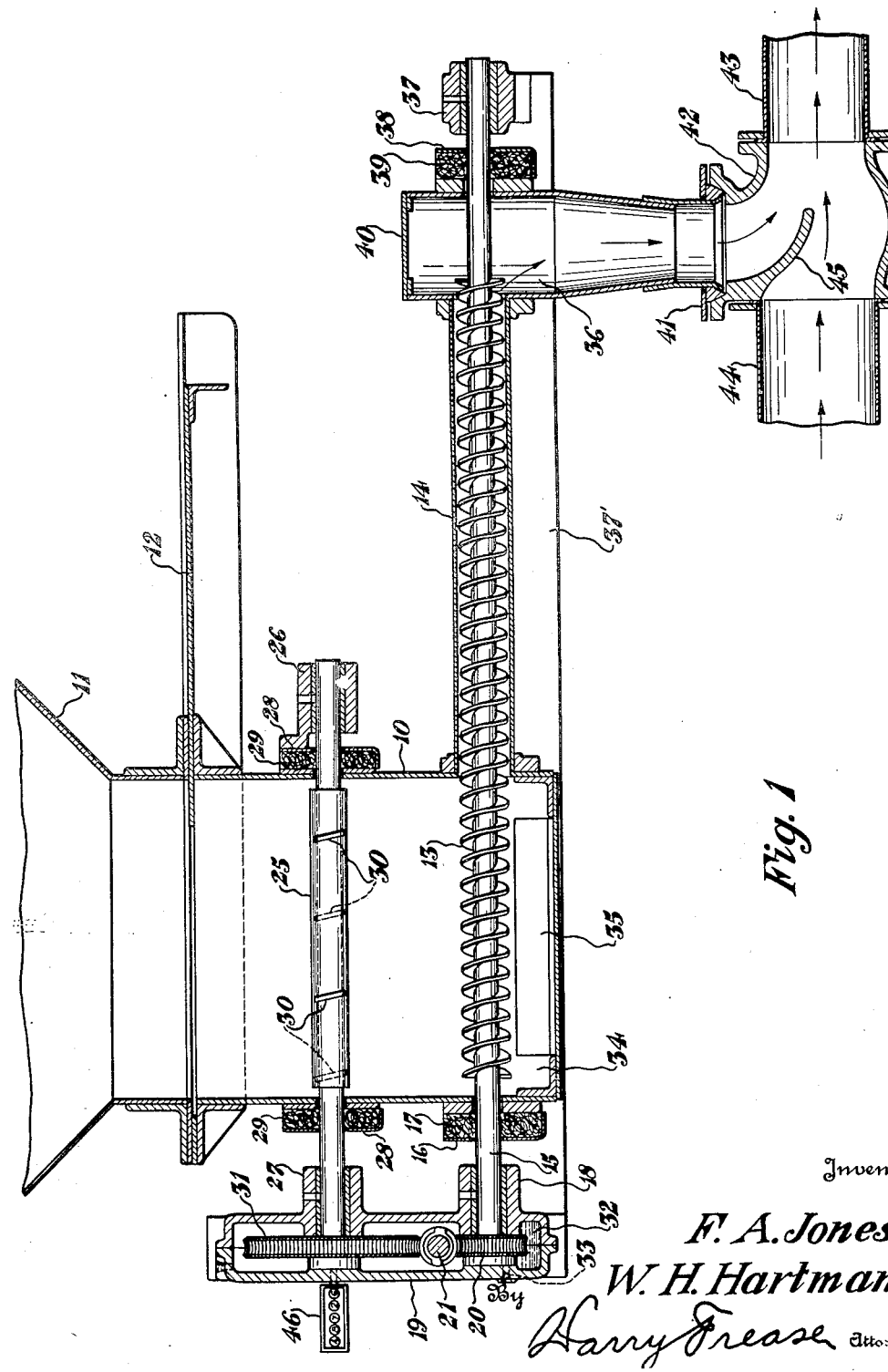

June 14, 1932.  F. A. JONES ET AL  1,862,752
PULVERIZED COAL FEEDER
Filed April 4, 1929   2 Sheets-Sheet 1

Inventors
F. A. Jones
W. H. Hartman
Harry Frease  Attorney

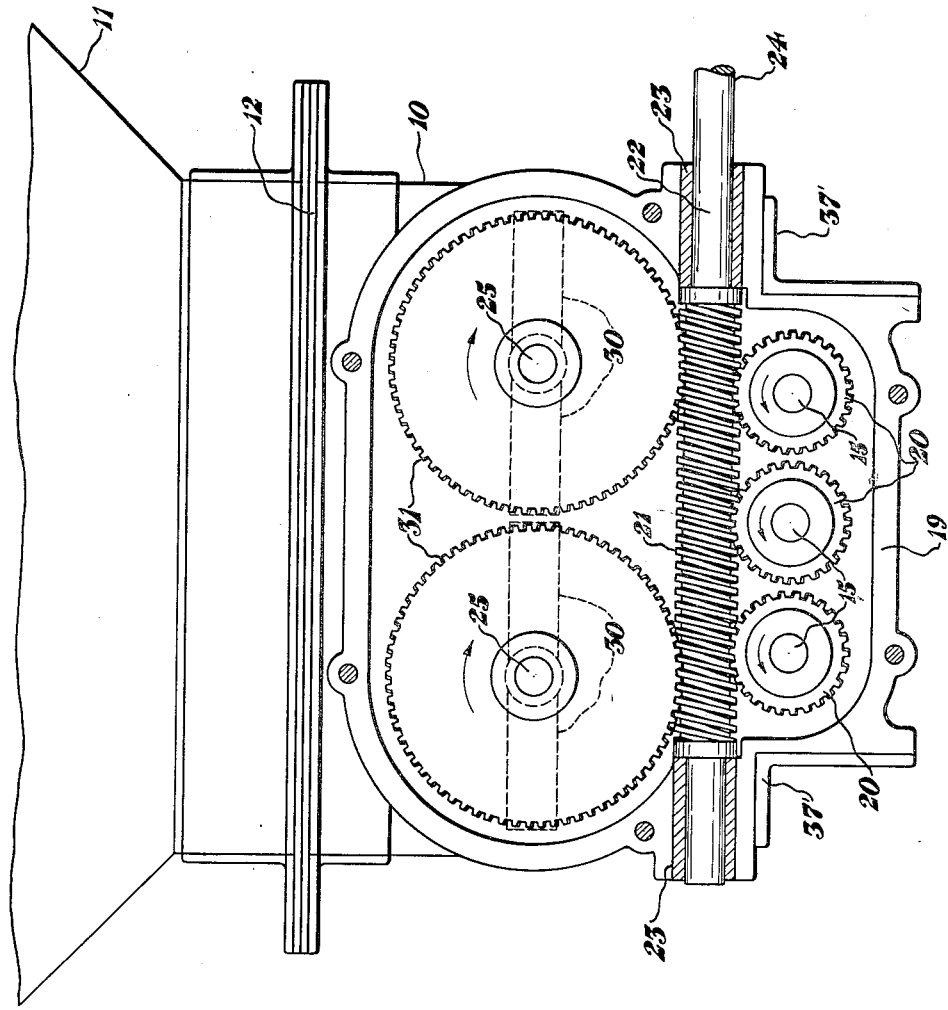

Patented June 14, 1932

1,862,752

UNITED STATES PATENT OFFICE

FRED A. JONES AND WILLIAM H. HARTMAN, OF CANTON, OHIO, ASSIGNORS TO JONES AND HARTMAN, INC., OF CANTON, OHIO, A CORPORATION OF OHIO

PULVERIZED COAL FEEDER

Application filed April 4, 1929. Serial No. 352,484.

The invention relates to apparatus for feeding powdered coal to furnaces and more particularly to an apparatus of this character adapted to feed the coal uniformly and evenly to the furnace.

Feeding apparatus, such as is now in common use, for feeding powdered coal, is so constructed and operated that the powdered coal frequently arches, in the feed housing or hopper, above the feeding screw or screws, thus more or less slowing up the feeding of the coal for a time, after which the coal so arched will fall in a mass upon the feed screws.

For the above and other reasons, such feeding apparatus does not provide a uniform and continuous flow of powdered coal to the furnace.

The object of the present improvement is to provide a pulverized coal feeder which will uniformly and continuously feed coal to the furnace without danger of the coal arching above the feed screws or any interruption at the discharge end of the feeder in the manner common in the operation of such coal feeders as are now in general use.

The above and other objects may be attained by providing a coal feeder having three or more substantially parallel feed screws for carrying the powdered fuel from the hopper to the furnace, agitators being located above the feed screws and arranged to continuously agitate the coal and prevent the same from arching above the feed screws.

An embodiment of the invention is illustrated in the accompanying drawings, in which Figure 1 is a longitudinal, sectional view through the improved coal feeder; and Fig. 2, an end view of the apparatus, with the cover plate removed to illustrate the gearing by means of which the conveyer screws and agitators are driven.

Similar numerals refer to similar parts throughout the drawings.

The improved coal feeder includes a housing 10, having a feed hopper 11 superposed thereon, a slide gate 12, controlling the flow of powdered coal from the hopper to the housing.

Within the lower portion of the housing are located three or more feed screws 13, each of which is preferably provided with a double thread as best shown in Fig. 1 of the drawings, each screw being located through a feed cylinder 14, communicating with the housing.

The shaft 15, of each screw, extends through the rear side of the housing and is preferably surrounded by a dust seal 16, filled with dry wool waste, or the like, as indicated at 17, in order to prevent dust from escaping from the housing and flying around the room in which the coal feeder is located.

These shafts are journaled in bearings 18, formed upon the gear casing 19, and each shaft has fixed upon its end portion a worm gear 20, located within the gear casing and meshing with the worm 21, fixed upon the drive shaft 22, which is journaled in suitable bearings 23 within the housing, one end of the drive shaft extending through its bearing, as indicated at 24, and arranged to be driven by any usual and well known means for continuously rotating said worm.

For the purpose of preventing the powdered coal from arching in the housing, above the feed screws, and to insure a steady and regular feed of coal to the screws, any desired number of agitators may be located in the housing, above the feed screws.

Two of these agitators are shown in the drawings, each comprising a shaft 25, journaled at one end in a bearing 26, carried by the housing, and at the other end in a bearing 27, formed upon the gear casing 19. These shafts are preferably located through dust seals 28, upon the walls of the housing, and filled with dry wool waste, or the like, as shown at 29, in order to prevent the escape of dust around the shafts.

A plurality of radial agitator blades 30 are carried by each of the shafts 25, within the housing, each of these blades being preferably angularly disposed, as shown in Fig. 1.

In order to drive the agitators, a worm gear 31 may be fixed upon the rear end portion of each shaft 25, within the gear casing 19, each worm gear meshing with the worm 21, upon the drive shaft.

With the arrangement illustrated in the drawings, each of the agitators will be continuously rotated in clockwise direction, while each of the feed screws will be continuously rotated in counter-clockwise direction, and at a considerably faster speed than the agitators.

An oil reservoir 32 is preferably formed in the lower portion of the gear casing and an oil level plug 33 provided at a suitable point therein in order to properly lubricate the worm and worm gears.

A tramp iron pocket 34 is preferably provided in the housing 10, below the feed screws in order to catch any tramp iron or other articles which may accidentally enter the housing with the coal, thus preventing damage to the screws. In order to remove such articles from time to time, a clean-out door 35 may be located in this pocket.

The forward ends of the feed screws terminate within a substantially vertical conduit 36, the shafts of the screws extending through the same and being journaled in suitable bearings 37 supported upon any stationary device adjacent to said conduit, such as the angles 37'.

For the purpose of preventing dust from escaping around the shafts at this point, dust seals 38 may be provided around the shafts, upon the outside of the conduit and filled with suitable material such as dry wool waste indicated at 39.

A normally closed inspection cover 40 may be provided at the upper end of the conduit 36 to provide access to the interior thereof when desired.

A swivel connection 41 is provided at the lower end of the conduit 36 for attachment of the coupling member 42. The forward end of this coupling member may be attached, as by the pipe 43, to a burner of any usual and well known design, while a pipe 44, leading from a fan or the like, communicates with the rear end of the coupling.

A depending angular flange 45 is preferably provided within the coupling in order to direct the powdered coal toward the burner and to also direct the air blast toward the burner so that the powdered coal from the conduit 36 will be picked up by the air and carried to the burner.

A recording counter 46 is attached to one of the agitator shafts, as shown in Fig. 1 and accurately records the number of revolutions made by the conveyer screws in any given period.

As the amount of coal fed, with each revolution of the conveyer screws, is a known quantity, an accurate check can be had on the amount of coal fed during this period, besides giving a good check on operation during the period.

Thus, by comparing the totals on the counter of the different working shifts, the management is able to gauge the performance of the mechanism.

We claim:
1. A powdered coal feeder including a housing, a plurality of feed screws located through the housing, a plurality of agitator shafts within the housing above the feed screws, a single conduit communicating with the housing to receive the fuel fed by all of said feed screws, and a drive shaft operatively connected to all of said feed screws and agitator shafts for driving all of the feed screws in one direction and all of the agitator shafts in the opposite direction.

2. A powdered coal feeder including a housing, a plurality of feed screws located through the housing, a plurality of agitator shafts within the housing above the feed screws, a single conduit communicating with the housing to receive the fuel fed by all of said feed screws, a worm gear fixed to each feed screw and agitator shaft, and a worm engaging all of said worm gears for driving all of the feed screws in one direction and all of the agitator shafts in the opposite direction.

In testimony that we claim the above, we have hereunto subscribed our names.

FRED A. JONES.
WILLIAM H. HARTMAN.